United States Patent
Kwon et al.

(10) Patent No.: US 9,926,067 B1
(45) Date of Patent: Mar. 27, 2018

(54) STRINGER FLANGE EXTENDING TO COMPOSITE SKIN EDGE

(71) Applicant: The Boeing Company, Chicago, IL (US)

(72) Inventors: Hyukbong Kwon, Mukilteo, WA (US); Paul E. Nelson, University Place, WA (US); Eduard Oyzerskiy, Sandy, UT (US); Robert W. Wakelee, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 970 days.

(21) Appl. No.: 13/913,764

(22) Filed: Jun. 10, 2013

(51) Int. Cl.
| | |
|---|---|
| *B64C 1/06* | (2006.01) |
| *B64C 1/12* | (2006.01) |
| *B64C 1/10* | (2006.01) |
| *B64C 3/18* | (2006.01) |
| *B32B 15/08* | (2006.01) |
| *B64C 1/00* | (2006.01) |

(52) U.S. Cl.
CPC .............. *B64C 1/064* (2013.01); *B32B 15/08* (2013.01); *B64C 1/061* (2013.01); *B64C 1/062* (2013.01); *B64C 1/065* (2013.01); *B64C 1/068* (2013.01); *B64C 1/069* (2013.01); *B64C 1/10* (2013.01); *B64C 1/12* (2013.01); *B64C 3/18* (2013.01); *B64C 3/182* (2013.01); *B64C 3/185* (2013.01); *B64C 3/187* (2013.01); *B32B 2605/18* (2013.01); *B64C 2001/0045* (2013.01); *B64C 2001/0072* (2013.01); *Y02T 50/12* (2013.01); *Y10T 428/24777* (2015.01)

(58) Field of Classification Search
CPC . B64C 1/061; B64C 1/064; B64C 2001/0072; B64C 1/06; B64C 1/068; B64C 1/069; B64C 1/12; B64C 3/182; B64C 1/10; B64C 1/062; B64C 3/185; B64C 1/065; B64C 2001/0045; B64C 3/18; B64C 3/187; Y02T 50/12; Y10T 428/1241; Y10T 428/24777; Y10T 29/49622; B32B 2605/18; B32B 15/08
USPC ................ 428/54, 60, 157, 172; 29/428
See application file for complete search history.

(56) References Cited

U.S. PATENT DOCUMENTS

| | | | | |
|---|---|---|---|---|
| 4,828,202 | A * | 5/1989 | Jacobs et al. | 244/117 R |
| 2009/0283638 | A1* | 11/2009 | Arevalo Rodriguez et al. | 244/119 |
| 2011/0115115 | A1* | 5/2011 | Winter | 264/175 |
| 2011/0174927 | A1 | 7/2011 | Hernandez et al. | |
| 2011/0284693 | A1* | 11/2011 | Barnard et al. | 244/132 |
| 2013/0075526 | A1* | 3/2013 | Griess et al. | 244/123.1 |
| 2013/0233973 | A1* | 9/2013 | Nordman et al. | 244/131 |

FOREIGN PATENT DOCUMENTS

WO WO 2011003844 A2 * 1/2011

OTHER PUBLICATIONS

Deobald, "Disbond Resistant Composite Stiffener Runout," U.S. Appl. No. 13/455,217, filed Apr. 25, 2012, 24 pages.

\* cited by examiner

*Primary Examiner* — Brian Handville
(74) *Attorney, Agent, or Firm* — Yee & Associates, P.C.

(57) ABSTRACT

A method and apparatus are provided. The apparatus comprises a composite stringer having a flange configured to contact a composite skin. The flange comprises a first region comprising tapered plies, a second region comprising tapered plies, and a first end. The first end is configured to extend to an edge of the composite skin.

20 Claims, 15 Drawing Sheets

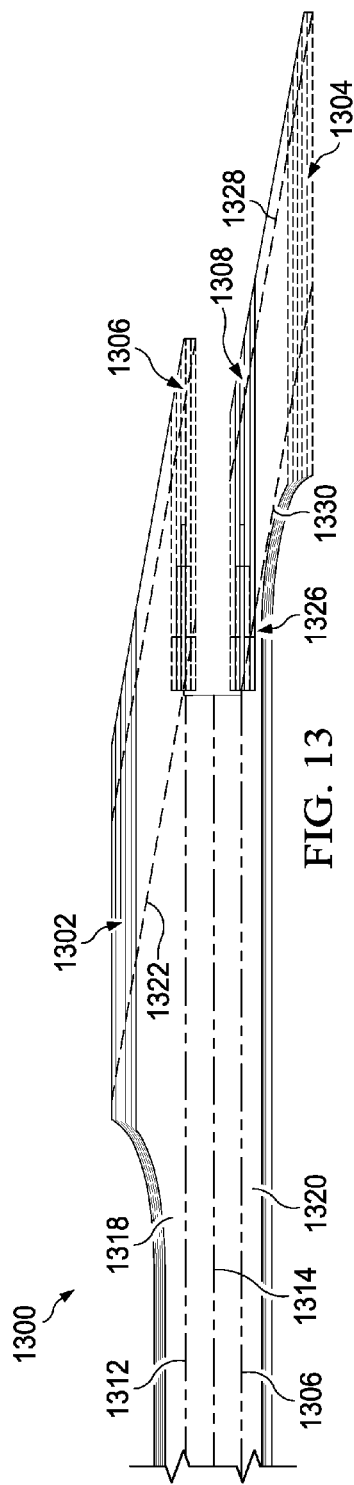
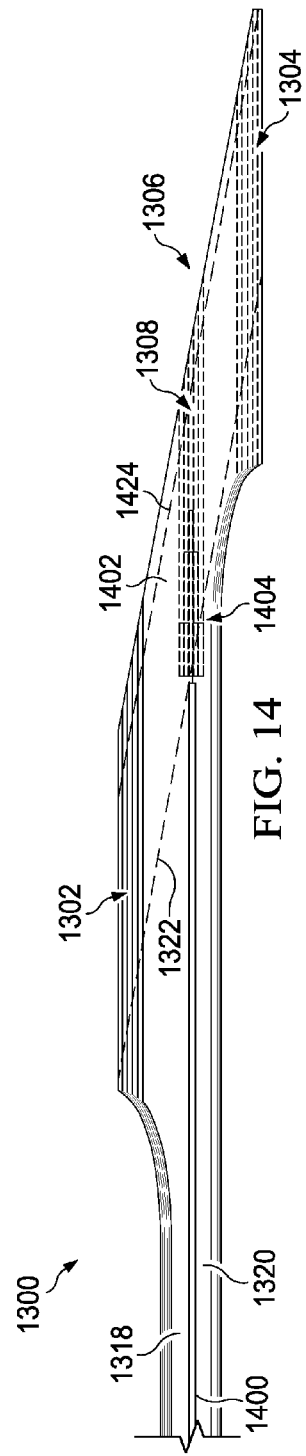
FIG. 13
FIG. 14

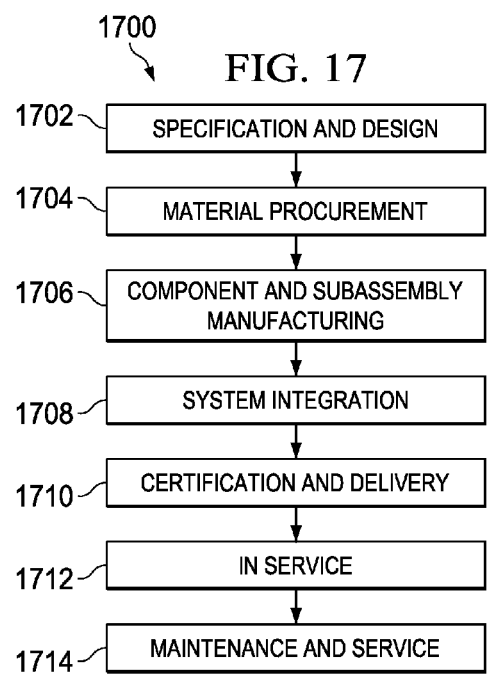
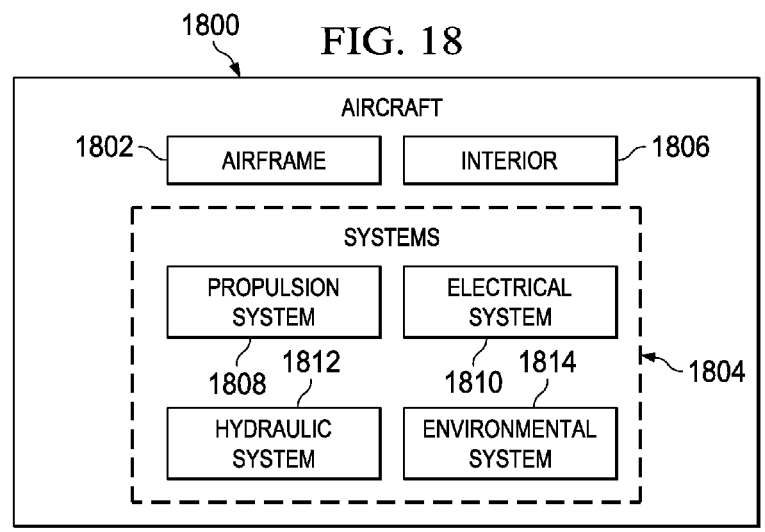

STRINGER FLANGE EXTENDING TO COMPOSITE SKIN EDGE

BACKGROUND INFORMATION

1. Field

The present disclosure relates generally to aircraft parts and, in particular, to aircraft stringers. More particularly, the present disclosure relates to a method and apparatus for a composite stringer.

2. Background

Aircraft generally include an airframe, which may be regarded as an underlying skeleton to which skins are attached to form a smooth aerodynamic outer surface. The wings also include an underlying structure covered with skins. Typically, skin panels are light and thin to minimize the weight of the aircraft and increase its payload and range. Since skins are thin, they are generally flexible and require stiffening to prevent undesired movement, flexing, and vibration during flight.

Stringers of various shapes have been used for decades in the aerospace industry for stiffening metal fuselage sections and metal wing skins on both commercial and military aircraft. These stringers are composed of thin metal panels with acute angles that result in an I shape, J shape, trapezoidal shape, rectangular shape, semi-circular shape, or some other suitable shape.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Composite stringer design may be more complicated than designing metal stringers. Specifically, composite stringers may be prone to manufacturing inconsistencies such as voids, wrinkles, and other inconsistencies. Further, due to the anisotropic nature of composites, composite stringers may delaminate.

Therefore, it would be desirable to have a method and apparatus that take into account at least some of the issues discussed above, as well as other possible issues.

SUMMARY

In an illustrative embodiment, an apparatus is provided. The apparatus comprises a composite stringer having a flange configured to contact a composite skin. The flange comprises a first region comprising tapered plies, a second region comprising tapered plies, and a first end. The first end is configured to extend to an edge of the composite skin.

In another illustrative embodiment, an apparatus is provided. The apparatus comprises a composite skin, a first composite stringer, and a second composite stringer. The composite skin has an edge. The first composite stringer has a first flange configured to contact the composite skin. The first flange comprises a first region comprising tapered plies, a second region comprising tapered plies, and a first end. The first end is configured to extend to the edge of the composite skin. The second composite stringer has a second flange configured to contact the composite skin. The second flange comprises a third region comprising tapered plies, a fourth region comprising tapered plies, and a second end. The second end is configured to extend to the edge of the composite skin.

In a further illustrative embodiment, a method is provided. A composite stringer is formed. The composite stringer has a flange configured to contact a composite skin. The flange comprises a first region comprising tapered plies, a second region comprising tapered plies, and a first end. The composite stringer is placed on the composite skin such that the first end of the composite stringer extends to an edge of the composite skin.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a composite layup prior to folding in accordance with an illustrative embodiment FIG. 14 is an illustration of a composite layup folded to form a composite stringer in accordance with an illustrative embodiment;

FIG. 17 is an illustration of an aircraft manufacturing and service method in the form of a block diagram in accordance with an illustrative embodiment; and FIG. 18 is an illustration of an aircraft in the form of a block diagram in which an illustrative embodiment may be implemented.

DETAILED DESCRIPTION

Figure 1:
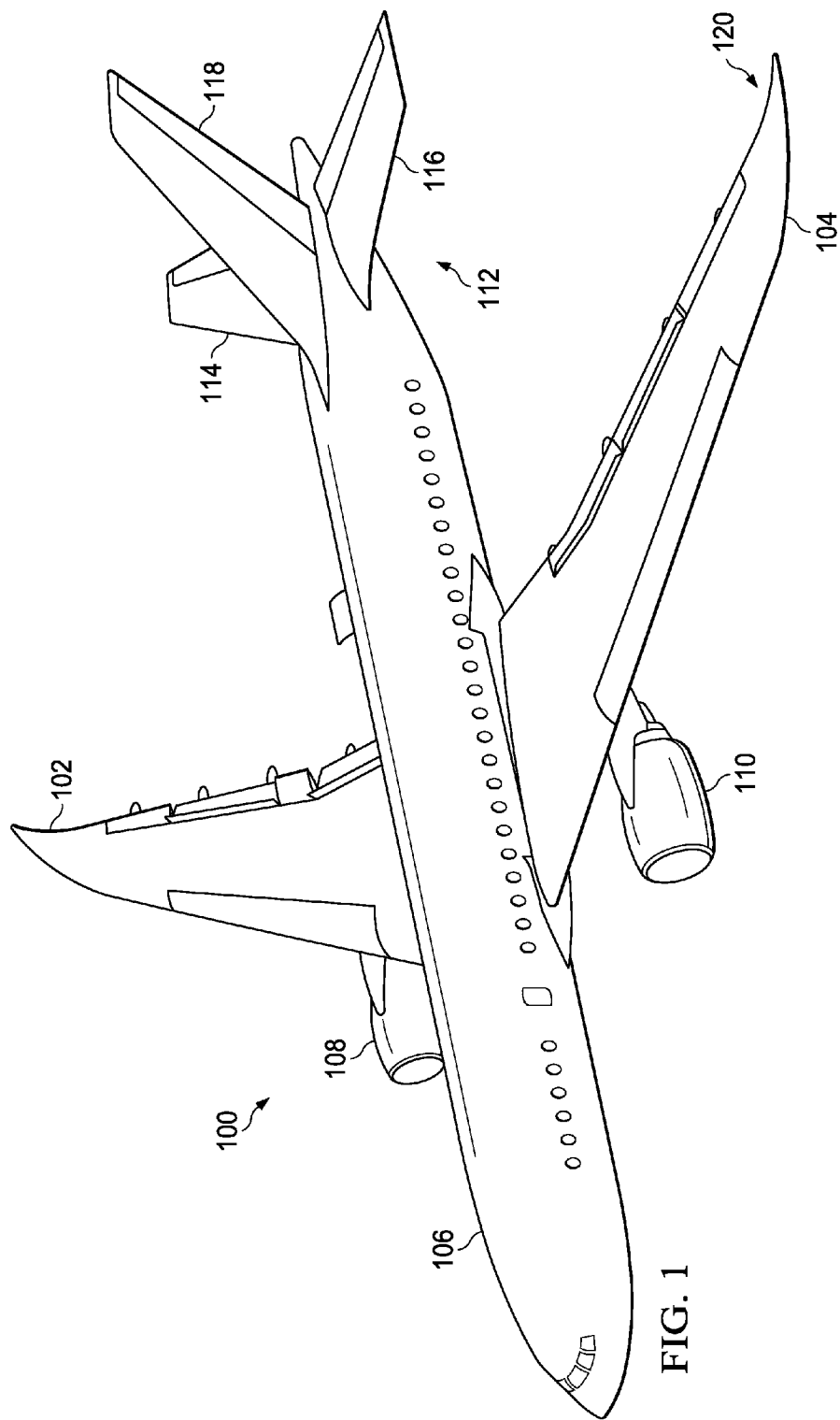
FIG. 1 is an illustration of an aircraft in which an illustrative embodiment may be implemented.

The different illustrative embodiments recognize and take into account different considerations. For example, the different illustrative embodiments recognize and take into account that in composite aircraft wings, a large portion of the loads may be carried through stringers that are bonded to the wing skins. The different illustrative embodiments also recognize that stringers have one or more flanges, which are configured to engage the skin surface. The different illustrative embodiments also recognize that in current designs, composite stringers may have flanges that terminate prior to an edge of a composite skin. The different illustrative embodiments recognize that in these current designs, an offset of the stringer flange end relative to the centroid load path of the wing skin may induce a bending moment that is reacted as a pull-off load in the stringer. The pull-off load may occur at the end of the stringer flange, where resistance to stress and strain concentrations may be needed. The different illustrative embodiments recognize and take into account that in metallic structures, this pull-off load at the end of the stringer flange may not be problematic due to the isotropic properties of the material system with respect to in and out of plane loading. However, the illustrative embodiments recognize and take into account that in composite structures, the out of plane loads may act on the laminate interface, resulting in delamination of composites.

In short, the different illustrative embodiments recognize and take into account that in the current designs, load transfer from the stringer to the composite skin may result in delamination in the stringer or the composite skin. The illustrative embodiments further recognize and take into account that difference in strain level between the stringer and the composite skin at the end of the stringer flange may drive the stringer delamination.

The illustrative embodiments recognize that current techniques to prevent delamination may include placing support over the stringer flange or creating a taper between the stringer flange and the composite skin. The illustrative embodiments recognize and take into account that reducing or eliminating the difference in strain level between the stringer and the skin may provide a weight savings over current techniques. Further, the illustrative embodiments recognize and take into account that reducing or eliminating the difference in strain level between the stringer and the skin may increase the strength of the stringer and the skin. Yet further, the illustrative embodiments recognize and take into account that reducing or eliminating the difference in strain level between the stringer and the skin may reduce at least one of manufacturing time and manufacturing costs.

Thus, in one illustrative embodiment, a composite stringer has a flange configured to contact a composite skin. The flange comprises a first region comprising tapered plies, a second region comprising tapered plies, and a first end. The first end is configured to extend to an edge of the composite skin.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a stringer flange extending to the composite skin edge may be implemented in accordance with an illustrative embodiment. For example, wing 104 of aircraft 100 may have a composite skin. Composite stringers having flanges extending to the edge of the composite skin may be implemented in wing 102, wing 104, horizontal stabilizer 114, horizontal stabilizer 116, or vertical stabilizer 118. In one illustrative example, composite stringers having flanges extending to the edge of the composite skin may be used in an outboard region of wing 104.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
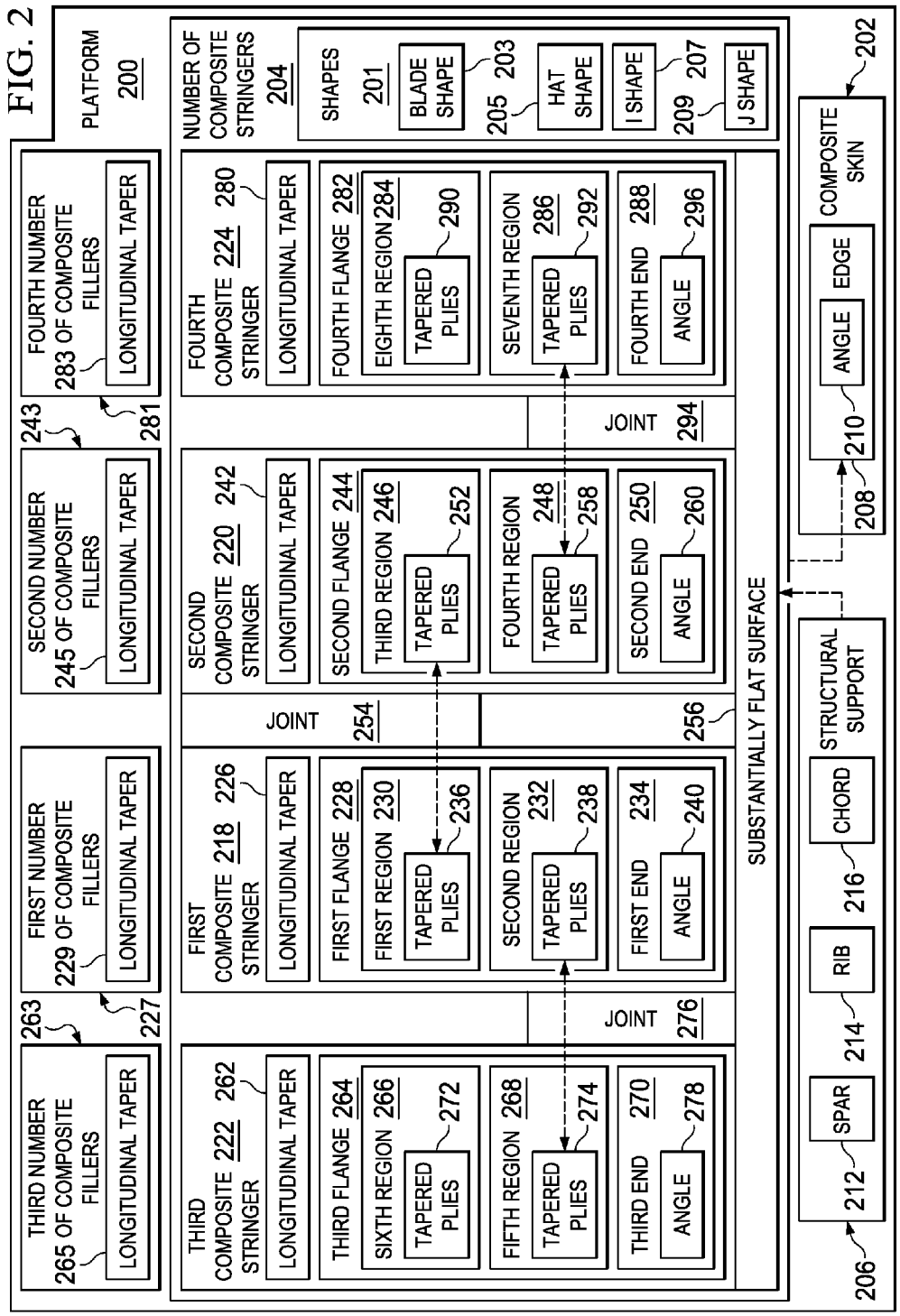
FIG. 2 is an illustration of a block diagram of a platform in accordance with an illustrative embodiment.

Turning now to FIG. 2, an illustration of a block diagram of a platform is depicted in accordance with an illustrative embodiment. In FIG. 2, platform 200 may be one implementation of aircraft 100. Although the illustrative examples for an illustrative embodiment are described with respect to an aircraft, an illustrative embodiment may be applied to other types of platforms. Platform 200 may be, for example, without limitation, a mobile platform, a stationary platform, a land-based structure, an aquatic-based structure, or a space-based structure. More specifically, platform 200 may be a surface ship, a tank, a personnel carrier, a train, a spacecraft, a space station, a satellite, a submarine, an automobile, a power plant, a bridge, a dam, a house, a manufacturing facility, a building, or other suitable platforms.

As depicted, platform 200 has composite skin 202, number of composite stringers 204, and structural support 206. As used herein, a "number of" items means one or more items. For example, number of composite stringers 204 means one or more composite stringers.

In this illustrative example, composite skin 202 has edge 208 with angle 210. Angle 210 may be measured relative to other edges of composite skin 202. Angle 210 may vary depending on the location of composite skin within platform 200. In one illustrative example, at an outboard location of an aircraft wing, angle 210 may have a first value. In another illustrative example, at an inboard location where an aircraft wing joins a fuselage, angle 210 may have a second value.

Structural support 206 may be associated with composite skin 202 and number of composite stringers 204. When one component is "associated" with another component, the association is a physical association in the depicted examples. For example, a first component may be considered to be associated with a second component by being placed onto the second component, secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Structural support 206 may take a number of different forms. Structural support 206 may be selected from a group comprising spar 212, rib 214, chord 216, or any other suitable support structure.

Number of composite stringers 204 may be placed onto composite skin 202. Number of composite stringers 204 may have first composite stringer 218, second composite stringer 220, third composite stringer 222, fourth composite stringer 224, and shapes 201. Number of composite stringers 204 may have blade shape 203, hat shape 205, I shape 207, J shape 209, or any other suitable shape.

First composite stringer 218 has longitudinal taper 226 and first flange 228. Longitudinal taper 226 may be formed by laying plies of composite materials at different lengths. First composite stringer 218 may engage first number of composite fillers 227 at longitudinal taper 226.

First number of composite fillers 227 has longitudinal taper 229. Longitudinal taper 229 may be formed in first number of composite fillers 227 using molding, machining, cutting, laying up of plies of different lengths or any other suitable method. In some illustrative examples, longitudinal taper 229 extends only a portion of first number of composite fillers 227.

Longitudinal taper 229 may be complementary to longitudinal taper 226. In other words, longitudinal taper 229 may complementarily engage longitudinal taper 226. As used herein, when a surface complementarily engages a second surface, the two surfaces may have substantially similar taper angles. As used herein, a taper angle may be the amount of slope in a surface in the taper.

Longitudinal taper 226 and longitudinal taper 229 may form a joint. In some illustrative examples, longitudinal taper 226 and longitudinal taper 229 may form a scarf joint. First number of composite fillers 227 terminates prior to first end 234 of first composite stringer 218.

First flange 228 of first composite stringer 218 comprises first region 230, second region 232, and first end 234. First region 230 comprises tapered plies 236. As used herein, tapered plies are plies which are laid such that each subsequent ply in the region has a different length. In some illustrative examples, each ply in the tapered plies may have an incrementally different length than a preceding ply. Second region 232 comprises tapered plies 238. First end 234 comprises angle 240. In some illustrative examples, angle 240 may be substantially the same as angle 210 of composite skin 202. In these illustrative examples, first composite stringer 218 may be placed such that first end 234 extends to edge 208 of composite skin 202.

Second composite stringer 220 has longitudinal taper 242 and second flange 244. Longitudinal taper 242 may be formed by laying plies of composite materials at different lengths. Second composite stringer 220 may engage second number of composite fillers 243 at longitudinal taper 242. As used herein, when two surfaces engage, the two surfaces are in physical contact.

Second number of composite fillers 243 has longitudinal taper 245. Longitudinal taper 245 may be formed in second number of composite fillers 243 using molding, machining, cutting, laying up of plies of different lengths or any other suitable method. In some illustrative examples, longitudinal taper 245 extends only a portion of second number of composite fillers 243. Longitudinal taper 245 may be complementary to longitudinal taper 242. In other words, longitudinal taper 245 may complementarily engage longitudinal taper 242. Longitudinal taper 242 and longitudinal taper 245 may form a joint. In some illustrative examples, longitudinal taper 242 and longitudinal taper 245 may form a scarf joint. Second number of composite fillers 243 terminates prior to second end 250 of second composite stringer 220.

Second flange 244 of second composite stringer 220 comprises third region 246, fourth region 248, and second end 250. Third region 246 has tapered plies 252. Tapered plies 252 are configured to engage tapered plies 236 of first composite stringer 218 to form joint 254. In some illustrative examples, joint 254 may be a scarf joint. In some illustrative examples, tapered plies 252 may complementarily engage tapered plies 236.

Tapered plies 252 may engage tapered plies 236 to form substantially flat surface 256. In some illustrative examples, tapered plies 252 may be placed over tapered plies 236 to form substantially flat surface 256. In other illustrative examples, tapered plies 236 may be placed over tapered plies 252 to form substantially flat surface 256. In platform 200, structural support 206 may be placed over substantially flat surface 256.

Fourth region 248 comprises tapered plies 258. Second end 250 has angle 260. In some illustrative examples, angle 260 may be substantially the same as angle 210 of composite skin 202. In these illustrative examples, second composite stringer 220 may be placed such that second end 250 extends to edge 208 of composite skin 202.

Third composite stringer 222 has longitudinal taper 262 and third flange 264. Longitudinal taper 262 may be formed by laying plies of composite materials at different lengths. Third composite stringer 222 may engage third number of composite fillers 263 at longitudinal taper 262.

Third number of composite fillers 263 has longitudinal taper 265. Longitudinal taper 265 may be formed in third number of composite fillers 263 using molding, machining, cutting, laying up of plies of different lengths or any other suitable method. In some illustrative examples, longitudinal taper 265 extends only a portion of third number of composite fillers 263. Longitudinal taper 265 may be complementary to longitudinal taper 262. In other words, longitudinal taper 265 may complementarily engage longitudinal taper 262. Longitudinal taper 262 and longitudinal taper 265 may form a joint. In some illustrative examples, longitudinal taper 262 and longitudinal taper 265 may form a scarf joint. Third number of composite fillers 263 terminates prior to third end 270 of third composite stringer 222.

Third flange 264 of third composite stringer 222 comprises fifth region 268, sixth region 266, and third end 270. Sixth region 266 has tapered plies 272. Fifth region 268 has tapered plies 274. Tapered plies 274 are configured to engage tapered plies 238 of first composite stringer 218 to form joint 276. In some illustrative examples, joint 276 may be a scarf joint. In some illustrative examples, tapered plies 274 may complementarily engage tapered plies 238.

Tapered plies 274 may engage tapered plies 238 to extend substantially flat surface 256. In some illustrative examples, tapered plies 274 may be placed over tapered plies 238 to extend substantially flat surface 256. In other illustrative examples, tapered plies 238 may be placed over tapered plies 274 to extend substantially flat surface 256. In platform 200, structural support 206 may be placed over substantially flat surface 256.

Third end 270 has angle 278. In some illustrative examples, angle 278 may be substantially the same as angle 210 of composite skin 202. In these illustrative examples, third composite stringer 222 may be placed such that third end 270 extends to edge 208 of composite skin 202.

Fourth composite stringer 224 has longitudinal taper 280 and fourth flange 282. Longitudinal taper 280 may be formed by laying plies of composite materials at different lengths. Fourth composite stringer 224 may engage fourth number of composite fillers 281 at longitudinal taper 280.

Fourth number of composite fillers 281 has longitudinal taper 283. Longitudinal taper 283 may be formed in fourth number of composite fillers 281 using molding, machining, cutting, laying up of plies of different lengths or any other suitable method. In some illustrative examples, longitudinal taper 283 extends only a portion of fourth number of composite fillers 281. Longitudinal taper 283 may be complementary to longitudinal taper 280. In other words, longitudinal taper 283 may complementarily engage longitudinal taper 280. Longitudinal taper 280 and longitudinal taper 283 may form a joint. In some illustrative examples, longitudinal taper 280 and longitudinal taper 283 may form a scarf joint. Fourth number of composite fillers 281 terminates prior to fourth end 288 of fourth composite stringer 224.

Fourth flange 282 of fourth composite stringer 224 comprises seventh region 286, eighth region 284, and fourth end 288. Eighth region 284 has tapered plies 290. Seventh region 286 has tapered plies 292. Tapered plies 292 are configured to engage tapered plies 258 of second composite stringer 220 to form joint 294. In some illustrative examples, joint 294 may be a scarf joint. In some illustrative examples, tapered plies 292 may complementarily engage tapered plies 258.

Tapered plies 292 may engage tapered plies 258 to extend substantially flat surface 256. In some illustrative examples, tapered plies 292 may be placed over tapered plies 258 to extend substantially flat surface 256. In other illustrative examples, tapered plies 258 may be placed over tapered plies 292 to extend substantially flat surface 256. In platform 200, structural support 206 may be placed over substantially flat surface 256.

Fourth end 288 has angle 296. In some illustrative examples, angle 296 may be substantially the same as angle 210 of composite skin 202. In these illustrative examples, fourth composite stringer 224 may be placed such that fourth end 288 extends to edge 208 of composite skin 202.

In platform 200, composite fillers such as first number of composite fillers 227, second number of composite fillers 243, third number of composite fillers 263, and fourth number of composite fillers 281 may ease the transfer of load from number of composite stringers 204 to composite skin 202. By extending first end 234, second end 250, third end 270, and fourth end 288 of number of composite stringers 204 to edge 208 of composite skin 202, difference in strain level between number of composite stringers 204 and composite skin 202 may be reduced or eliminated. Further, delamination of number of composite stringers 204 may be reduced or prevented as a result of this extension.

Structural support 206 may run along edge 208 of composite skin 202. In conventional designs in which structural supports directly engage the composite skin, having stringers run through structural supports such as structural support 206 may complicate the design and fabrication of the structural support. Accordingly, previously designed composite stringers terminate prior to these structural supports.

As first end 234, second end 250, third end 270, and fourth end 288 extend to edge 208 of composite skin 202, structural support 206 is placed over first flange 228, second flange 244, third flange 264, and fourth flange 282. To engage structural support 206, first flange 228, second flange 244, third flange 264, and fourth flange 282 form substantially flat surface 256.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sixth region 266 of third composite stringer 222 may not comprise tapered plies 272. In this illustrative example, sixth region 266 may extend substantially flat surface 256 without forming a joint with an adjacent composite stringer. In another illustrative example, eighth region 284 of fourth composite stringer 224 may not comprise tapered plies 290. In this illustrative example, eighth region 284 may extend substantially flat surface 256 without forming a joint with an adjacent composite stringer. In yet another illustrative example, first number of composite fillers 227 may not have longitudinal taper 229. In this illustrative example, first composite stringer 218 may not have longitudinal taper 226. Yet further, number of composite stringers 204 is depicted as comprising four composite stringers. In some illustrative examples, composite stringers 204 may contain more or fewer than four composite stringers. In one illustrative example, number of composite stringers 204 may comprise three composite stringers.

Figure 3:
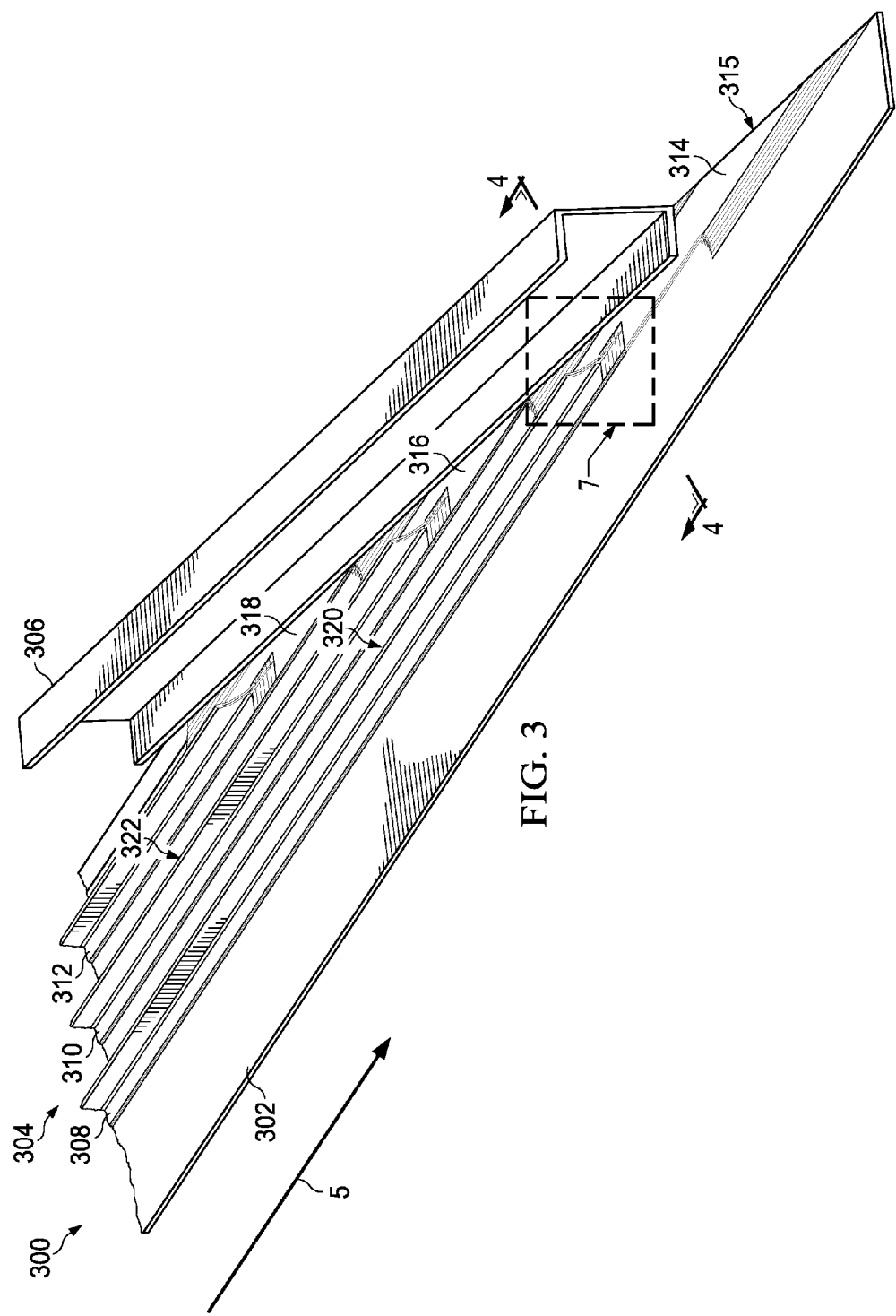
FIG. 3 is an illustration of composite blade stringers positioned on a composite skin in accordance with an illustrative embodiment.

Turning now to FIG. 3, an illustration of composite blade stringers positioned on a composite skin is depicted in accordance with an illustrative embodiment. In this depicted example, composite stringers 304 are an example of a physical implementation of number of composite stringers 204 of FIG. 2. In this depicted example, composite skin 302 may be a physical implementation of composite skin 202 of FIG. 2. Structure 300 may be a physical implementation of a portion of platform 200 of FIG. 2.

As depicted, structure 300 comprises composite skin 302, composite stringers 304, and structural support 306. Composite stringers 304 comprise composite stringer 308, composite stringer 310, and composite stringer 312. Composite stringer 308 has flange 314 which increases in surface area near edge 315 of composite skin 302. Flange 314 is configured to contact composite skin 302. In some illustrative examples, portions of flange 314 which contact composite skin 302 may be substantially flat. Composite stringer 310 has flange 316 which increases in surface area as flange 316 nears edge 315 of composite skin 302. Composite stringer 312 has flange 318 which increases in surface area as flange 318 nears edge 315 of composite skin 302.

As depicted, flange 314, flange 316, and flange 318 engage each other near edge 315 of composite skin 302.

Specifically, flange 314 engages flange 316, and flange 316 engages flange 318. By flange 314, flange 316, and flange 318 engaging each other, loads carried by composite stringer 308, composite stringer 310, and composite stringer 312 may be transferred into composite skin 302 across a wider area. Specifically, loads carried by composite stringer 308, composite stringer 310, and composite stringer 312 may be transferred into composite skin 302 across all of edge 315.

Moving away from edge 315 of composite skin 302, flange 314, flange 316, and flange 318 may cease to engage each other. As depicted, flange 314 and flange 316 do not engage each other at location 320. As depicted, flange 316 and flange 318 do not engage each other at location 322.

The illustration in FIG. 3 is only one example of a physical implementation for a portion of platform 200 shown in block form in FIG. 2 and is not meant to limit the manner in which platform 200 may be implemented. For example, structure 300 is depicted as having three composite stringers. However, in some illustrative embodiments, a greater or lesser number of composite stringers may be used. Further, as depicted, each composite stringer has two regions with tapered plies. In some illustrative examples, a number of composite stringers may have only one region with tapered plies.

Figure 4:
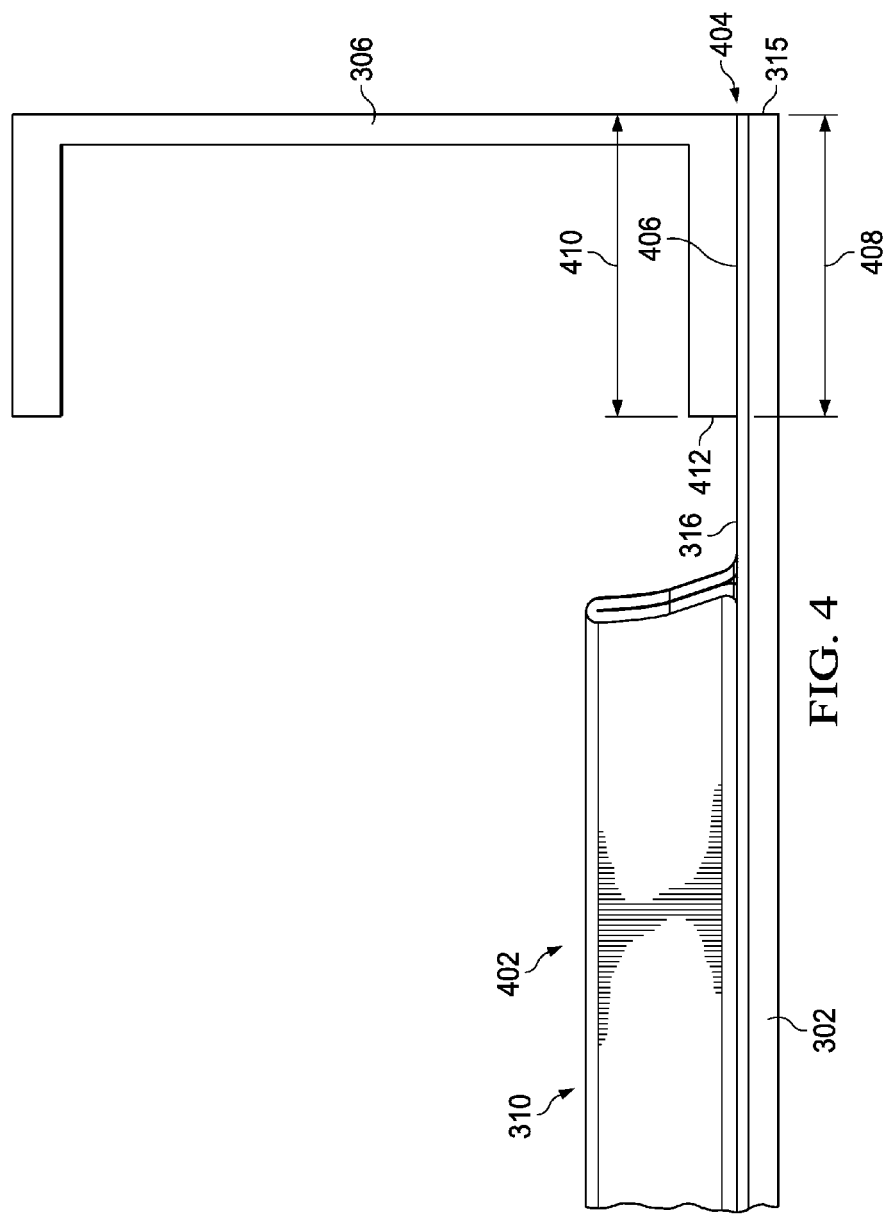
FIG. 4 is a cross-section of a composite stringer on a composite skin in accordance with an illustrative embodiment.

Turning now to FIG. 4, a cross-section of a composite stringer on a composite skin is depicted in accordance with an illustrative embodiment. In this depicted example, composite stringer 310 is a physical implementation of second composite stringer 220 of FIG. 2. FIG. 4 is a cross-sectional view of FIG. 3 along line 4-4.

As depicted, composite stringer 310 takes the form of blade shaped composite stringer 402. Composite stringer 310 has flange 316. As depicted, first end 404 of flange 316 extends to edge 315 of composite skin 302.

Structural support 306 is placed on top of substantially flat surface 406. Substantially flat surface 406 comprises flange 316 of composite stringer 310. Substantially flat surface 406 has width 408. As depicted, width 408 is substantially the same as width 410 of base 412 of structural support 306. In some illustrative examples, width 408 of substantially flat surface 406 may be larger than width 410 of base 412.

Structural support 306 extends into and out of the plane of the page. Additionally, substantially flat surface 406 extends into and out of the plane of the page. Substantially flat surface 406 may also comprise additional flanges of additional composite stringers not depicted in FIG. 4.

Figure 5:
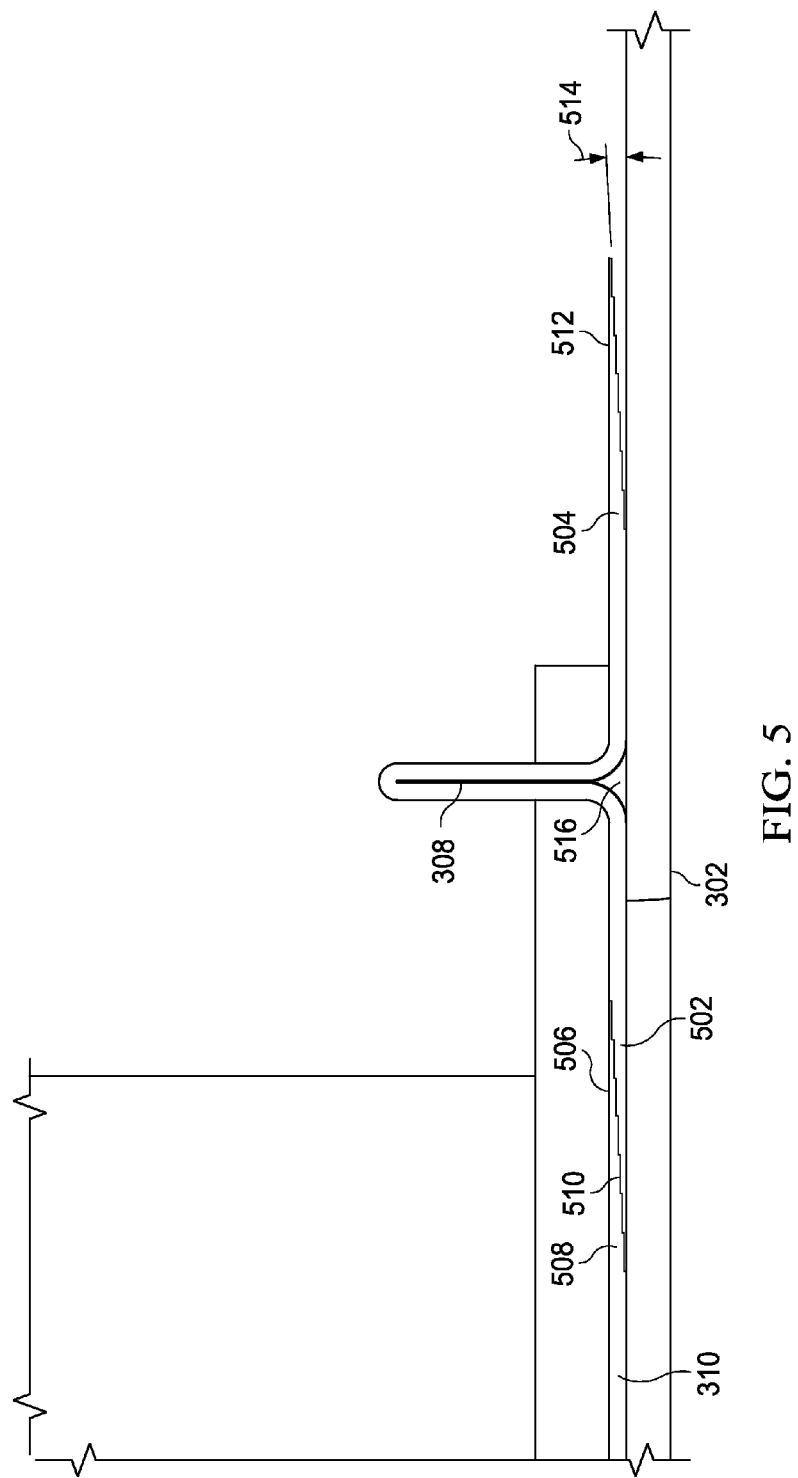
FIG. 5 is an illustration of an end view of a composite stringer on a composite skin in accordance with an illustrative embodiment.

Turning now to FIG. 5, an illustration of an end view of a composite stringer on a composite skin is depicted in accordance with an illustrative embodiment. In this depicted example, composite stringer 308 is an example of a physical implementation of first composite stringer 218 of FIG. 2. FIG. 5 is an end view of structure 300 of FIG. 3 from direction 5.

As depicted, composite stringer 308 has first region 502 and second region 504. First region 502 has tapered plies 506. Tapered plies 506 engage tapered plies 508 of third region 510 of composite stringer 310 to form a joint. As depicted, tapered plies 506 and tapered plies 508 of composite stringer 310 form a substantially flat surface when engaged. As depicted, tapered plies 506 create an upward taper angle. As depicted, this taper angle is configured to be substantially the same as a downward taper angle of tapered plies 508 of composite stringer 310.

Second region 504 has tapered plies 512. Tapered plies 512 may engage with tapered plies of a neighboring composite stringer to form a joint. Tapered plies 512 and the tapered plies of the neighboring stringer may form a substantially flat surface when engaged. Tapered plies 512 have taper angle 514. As depicted, taper angle 514 of tapered plies 512 is a downward taper angle. Taper angle 514 may be configured to be substantially the same as an upward angle of tapered plies of a neighboring composite stringer.

As depicted, composite filler 516 is positioned between portions of composite stringer 308 and composite skin 302. In some illustrative examples, composite filler 516 may taper into the page as illustrated. In these illustrative examples, this longitudinal taper may allow composite filler 516 to engage composite stringer 308. Specifically, in some illustrative examples, composite stringer 308 and composite filler 516 may have complementary longitudinal tapers to form a joint.

Figure 6:
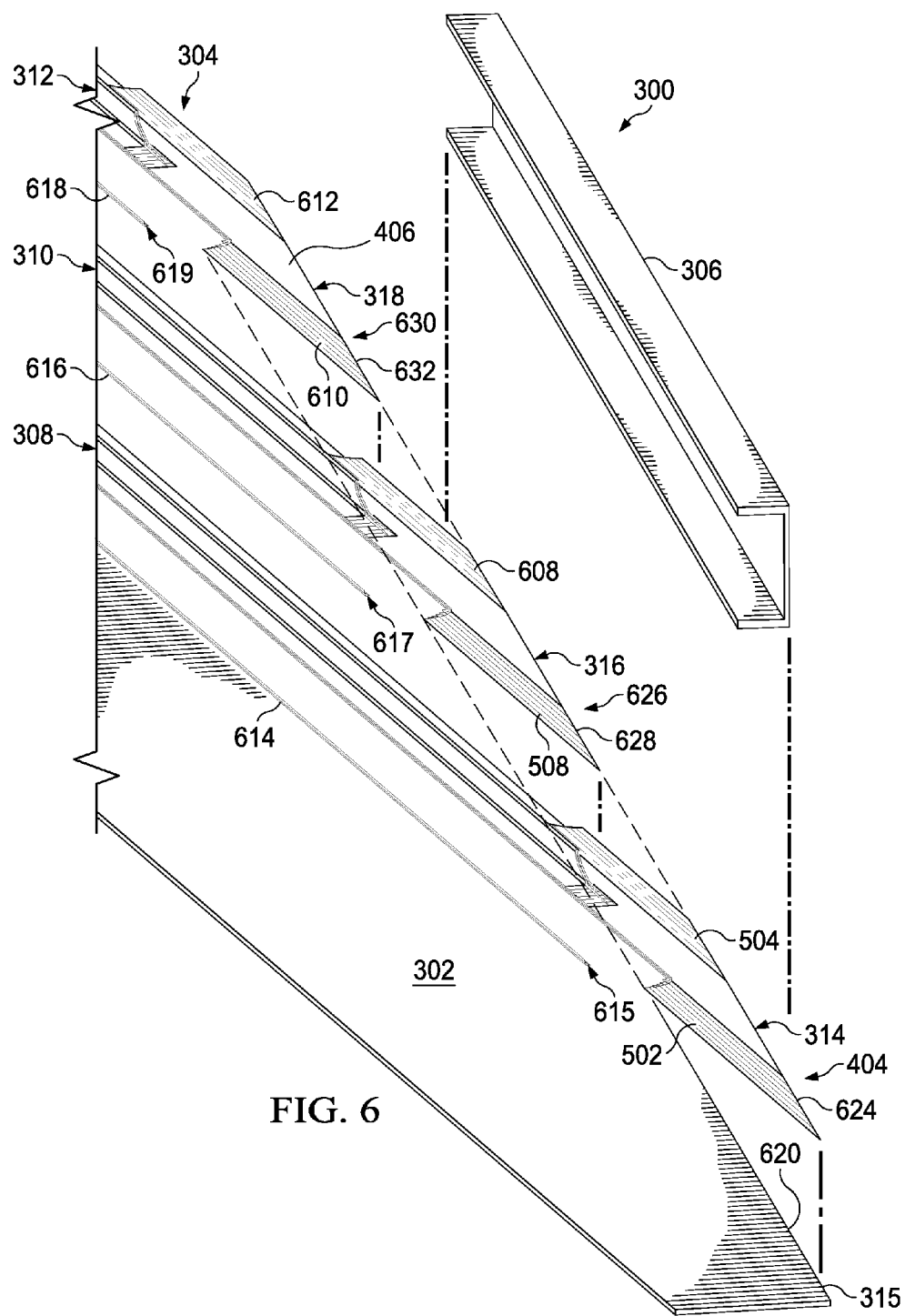
FIG. 6 is an illustration of an exploded view of composite blade stringers positioned on a composite skin in accordance with an illustrative embodiment.

Turning now to FIG. 6, an illustration of an exploded view of composite blade stringers positioned on a composite skin is depicted in accordance with an illustrative embodiment. In this depicted example, composite stringers 304 are an example of a physical implementation of number of composite stringers 204 of FIG. 2. In this depicted example, composite skin 302 may be a physical implementation of composite skin 202 of FIG. 2. FIG. 6 is an exploded view of structure 300 of FIG. 3.

As depicted, flange 314 of composite stringer 308 has first region 502 and second region 504. First region 502 comprises tapered plies creating a downward taper. Second region 504 comprises tapered plies creating an upward taper.

Flange 316 of composite stringer 310 has third region 508 and fourth region 608. Third region 508 comprises tapered plies creating a downward taper. As depicted in FIG. 5, third region 508 is placed over and engages second region 504.

By tapered plies of third region 508 engaging tapered plies of second region 504, a joint may be formed. In some illustrative examples, this joint may be a scarf joint. In some illustrative examples, the tapered plies of third region 508 may have a complementary taper to tapered plies of second region 504.

By tapered plies of third region 508 engaging tapered plies of second region 504, substantially flat surface 406 may be created. In FIG. 5, the substantially flat surface 406 extends within the dashed lines. As depicted in FIG. 4, structural support 306 may be placed over and engage substantially flat surface 406. Structural support 306 engaging substantially flat surface 406 may provide desirable bending or mechanical characteristics to structure 300.

Fourth region 608 comprises tapered plies creating an upward taper. In some illustrative examples, tapered plies of fourth region 608 may create a taper substantially similar to the taper of second region 504. In some illustrative examples, flange 314 of composite stringer 308 and flange 316 of composite stringer 310 may be of the same design. In these illustrative examples, third region 508 may create a taper substantially similar to the taper of first region 502.

Flange 318 of composite stringer 312 may have fifth region 610 and sixth region 612. In some illustrative embodiments, flange 314 of composite stringer 308, flange 316 of composite stringer 310, and flange 318 of composite stringer 312 may be of the same design. Fifth region 610 comprises tapered plies forming a downward taper. In some illustrative examples, tapered plies of fifth region 610 may form a taper substantially similar to the taper of third region 508, first region 502, or both third region 508 and first region 502. As depicted in FIG. 5, fifth region 610 is placed over and engages fourth region 608.

By tapered plies of fifth region 610 engaging tapered plies of fourth region 608, a joint may be formed. In some illustrative examples, this joint may be a scarf joint. In some illustrative examples, the tapered plies of fifth region 610 may have a complementary taper to tapered plies of fourth region 608.

As depicted, composite filler 516 may be associated with composite stringer 308. As assembled in FIG. 5, composite filler 516 may be positioned between composite stringer 308 and composite skin 302. Composite filler 516 has longitudinal taper 615. Longitudinal taper 615 of composite filler 516 engages a longitudinal taper in composite stringer 308. In some illustrative examples, longitudinal taper 615 may be complementary to the longitudinal taper in composite stringer 308.

As depicted, composite filler 616 may be associated with composite stringer 310. As assembled in FIG. 5, composite filler 616 may be positioned between portions of composite stringer 310 and composite skin 302. Composite filler 616 has longitudinal taper 617. Longitudinal taper 617 of composite filler 616 engages a longitudinal taper in composite stringer 310. In some illustrative examples, longitudinal taper 617 may be complementary to the longitudinal taper in composite stringer 310.

As depicted, composite filler 618 may be associated with composite stringer 312. As assembled in FIG. 5, composite filler 618 may be positioned between composite stringer 312 and composite skin 302. Composite filler 618 has longitudinal taper 619. Longitudinal taper 619 of composite filler 618 engages a longitudinal taper in composite stringer 312. In some illustrative examples, longitudinal taper 619 may be complementary to the longitudinal taper in composite stringer 312.

Composite stringer 308 has first end 404. Composite stringer 310 has second end 626. Composite stringer 312 has third end 630. As depicted in FIG. 4, first end 404, second end 626, and third end 630 may be positioned to extend to edge 315 of composite skin 302.

Edge 315 of composite skin 302 has angle 620. First end 404 has angle 624. Angle 624 may be substantially similar to angle 620 of composite skin 302 to allow flange 314 to extend to edge 315. Second end 626 has angle 628. Angle 628 may be substantially similar to angle 620 of composite skin 302 to allow flange 316 to extend to edge 315. Third end 630 has angle 632. Angle 632 may be substantially similar to angle 620 of composite skin 302 to allow flange 318 to extend to edge 315.

Figure 7:
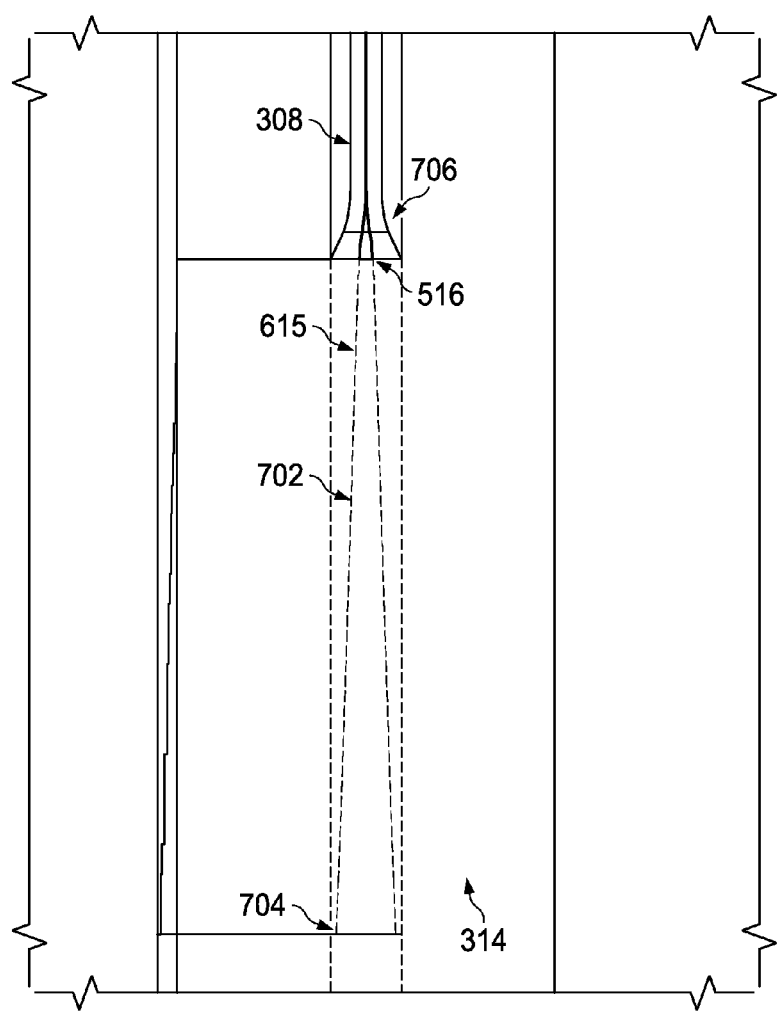
FIG. 7 is an illustration of a top view of a composite stringer on a composite skin in accordance with an illustrative embodiment.

Turning now to FIG. 7, an illustration of a top view of a composite stringer on a composite skin is depicted in accordance with an illustrative embodiment. FIG. 7 is a top view of structure 300 of FIG. 3 within box 7. Specifically, FIG. 7 is a top view of composite stringer 308 of FIG. 3 within box 7.

As depicted, composite filler 516 is associated with composite stringer 308. Specifically, composite filler 516 is positioned between composite stringer 308 and composite skin 302. Composite filler 516 has longitudinal taper 615 which is shown in phantom. Composite filler 516 decreases in size along longitudinal taper 615 until composite filler 516 terminates at location 704.

Longitudinal taper 615 of composite filler 516 engages longitudinal taper 702 in composite stringer 308, shown in phantom. As depicted, longitudinal taper 615 is complementary to longitudinal taper 702 in composite stringer 308.

Within body portion 706 of composite stringer 308, composite filler 516 may have a substantially constant cross-section. As depicted in FIG. 7 and FIG. 5, within body portion 706 of composite stringer 308, composite filler 516 has a semi-triangular cross-section. In some illustrative examples, composite filler 516 may have a varying cross-section.

Figure 8:
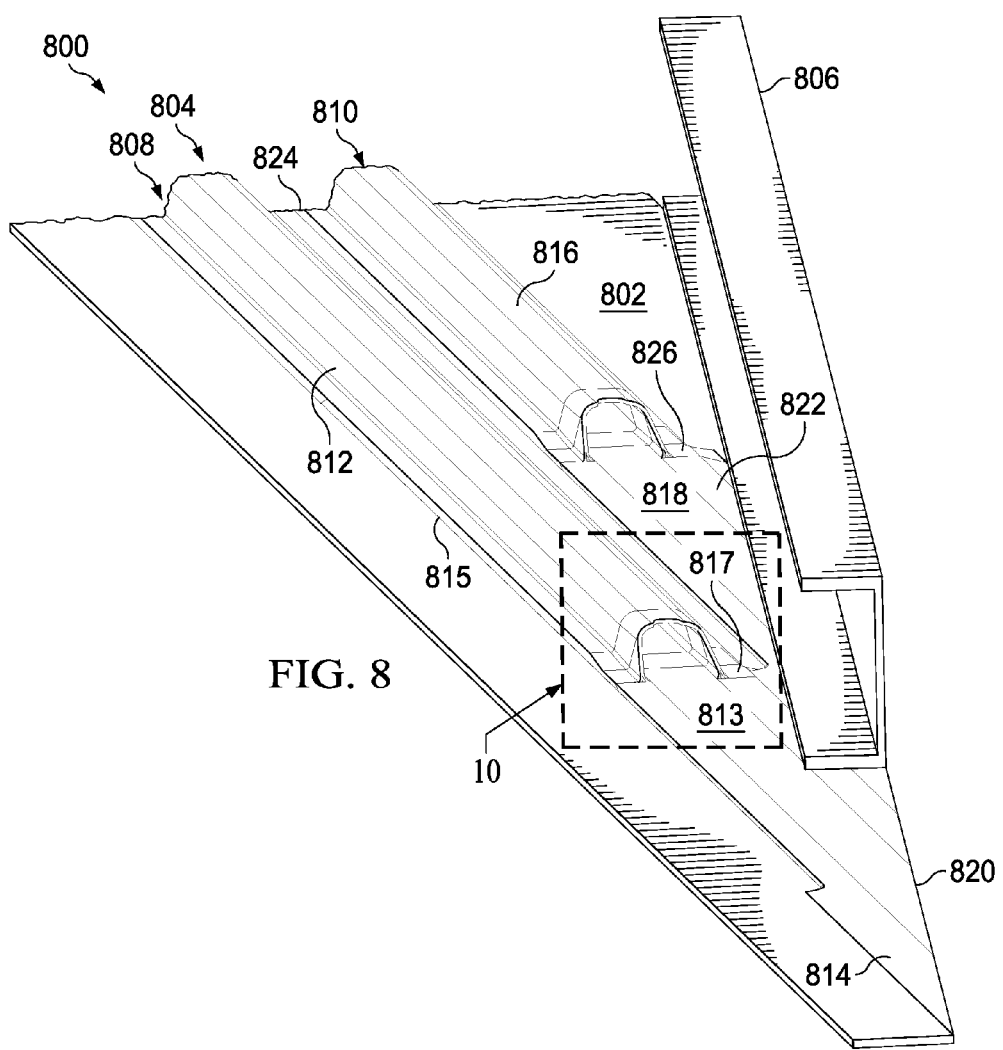
FIG. 8 is an illustration of composite hat shaped stringers positioned on a composite skin in accordance with an illustrative embodiment.

Turning now to FIG. 8, an illustration of composite hat shaped stringers positioned on a composite skin is depicted in accordance with an illustrative embodiment. In this depicted example, composite stringers 804 are an example of a physical implementation of number of composite stringers 204 of FIG. 2. In this depicted example, composite skin 802 may be a physical implementation of composite skin 202 of FIG. 2. Structure 800 may be a physical implementation of a portion of platform 200 of FIG. 2.

As depicted, structure 800 comprises composite skin 802, composite stringers 804, and structural support 806. Composite stringers 804 comprises composite stringer 808 and composite stringer 810. Composite stringer 808 has outer charge 812 and inner charge 813. Outer charge 812 is an outer layup of composite materials. Inner charge 813 is an inner layup of composite materials. Inner charge 813 has flange 814 which engages flange 815 and flange 817 of outer charge 812. Flange 814, flange 815, and flange 817 are configured to contact composite skin 802. In some illustrative examples, portions of flange 814 which contact composite skin 802 may be substantially flat.

Inner charge 813 of composite stringer 808 may engage the inner surface of outer charge 812. Flange 814 may extend to edge 820 of composite skin 802.

Composite stringer 810 has outer charge 816 and inner charge 818. Outer charge 816 is an outer layup of composite materials. Inner charge 818 is an inner layup of composite materials. Inner charge 818 has flange 822 which engages flange 824 and flange 826 of outer charge 816. Flange 822, flange 824, and flange 826 are configured to contact composite skin 802. In some illustrative examples, portions of flange 822 which contact composite skin 802 may be substantially flat.

Inner charge 818 of composite stringer 810 may engage the inner surface of outer charge 816. Flange 822 may extend to edge 820 of composite skin 802. Structural support 806 may be positioned on top of flange 814 and flange 822 along edge 820 of composite skin 802.

Figure 9:
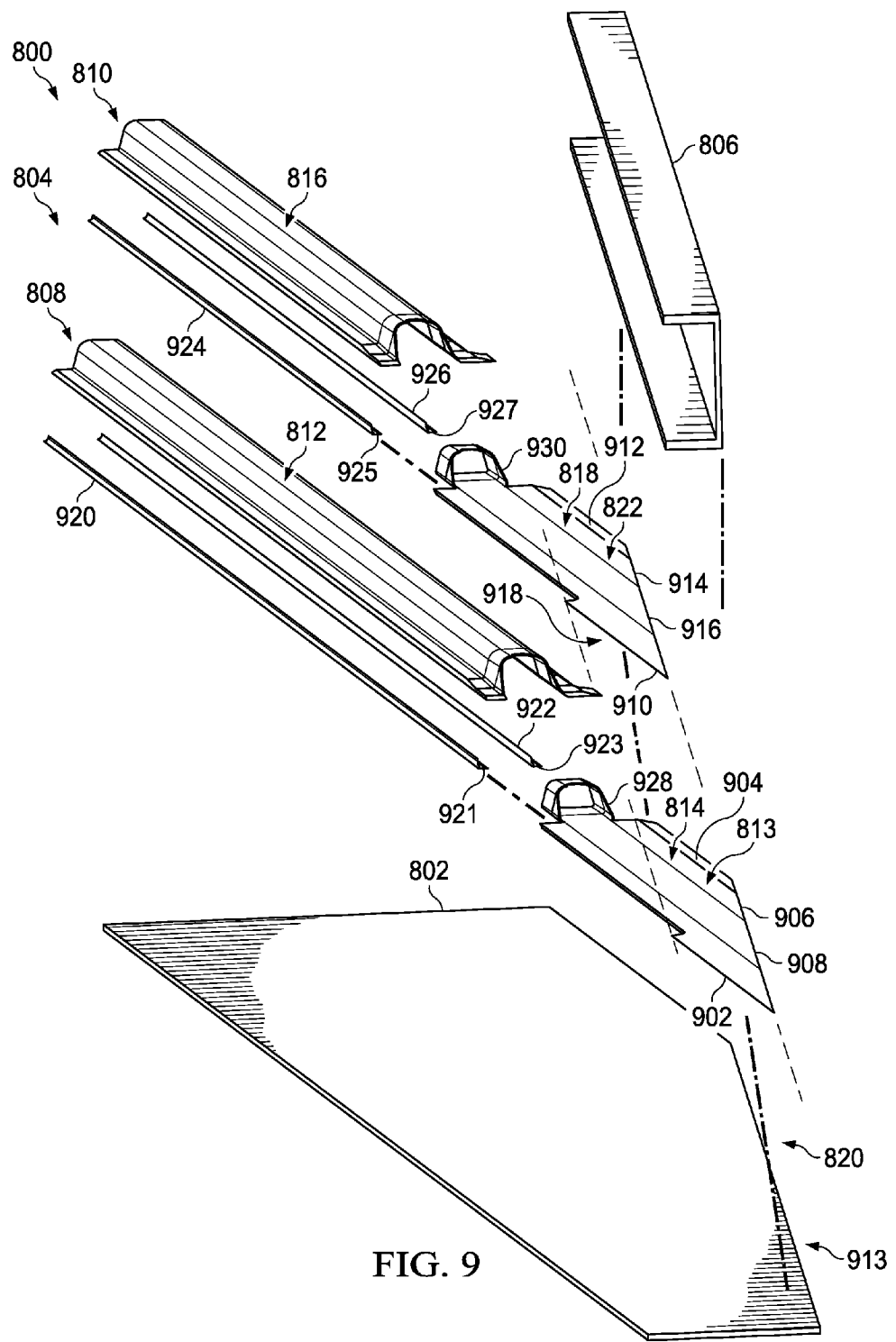
FIG. 9 is an illustration of an exploded view of composite hat shaped stringers positioned on a composite skin in accordance with an illustrative embodiment.

Turning now to FIG. 9, an illustration of an exploded view of composite hat shaped stringers positioned on a composite skin is depicted in accordance with an illustrative embodiment. In this depicted example, composite stringers 804 are an example of a physical implementation of number of composite stringers 204 of FIG. 2. In this depicted example, composite skin 802 may be a physical implementation of composite skin 202 of FIG. 2. FIG. 9 is an exploded view of structure 800 of FIG. 8.

As depicted, flange 814 has first region 902, second region 904, and first edge 906. First region 902 comprises tapered plies creating a downward taper. Second region 904 comprises tapered plies creating an upward taper.

Flange 822 has third region 910, fourth region 912, and second edge 914. Third region 910 comprises tapered plies creating a downward taper. Fourth region 912 comprises tapered plies creating an upward taper. As depicted in FIG. 8, third region 910 is placed over and engages second region 904.

By tapered plies of third region 910 engaging tapered plies of second region 904, a joint may be formed. In some illustrative examples, this joint may be a scarf joint. In some illustrative examples, the tapered plies of third region 910 may have a complementary taper to tapered plies of second region 904.

Substantially flat surface 918 may be created by tapered plies of third region 910 engaging tapered plies of second region 904. As depicted in FIG. 8, structural support 806 may be placed over and engage substantially flat surface 918. Structural support 806 engaging substantially flat surface 918 may provide desirable bending or mechanical characteristics to structure 800.

Edge 820 of composite skin 802 has angle 913. First edge 906 has angle 908. Angle 908 may be substantially similar to angle 913 of composite skin 802 to allow flange 814 to extend to edge 820. Second edge 914 has angle 916. Angle 916 may be substantially similar to angle 913 of composite skin 802 to allow flange 822 to extend to edge 820.

As depicted, composite filler 920 and composite filler 922 are associated with composite stringer 808. As assembled in FIG. 8, composite filler 920 and composite filler 922 engage outer charge 812, inner charge 813, and composite skin 802. Composite filler 920 may be positioned between outer charge 812 and inner charge 813 on one side of composite stringer 808. Composite filler 922 may be positioned between outer charge 812 and inner charge 813 on an opposite side of composite stringer 808.

Composite filler 920 and composite filler 922 have longitudinal taper 921 and longitudinal taper 923. Longitudinal taper 921 of composite filler 920 engages a longitudinal taper in inner charge 813 of composite stringer 808. Longitudinal taper 923 of composite filler 922 engages another longitudinal taper in inner charge 813 of composite stringer 808. In some illustrative examples, longitudinal taper 921 and longitudinal taper 923 may be complementary to respective longitudinal tapers in inner charge 813 of composite stringer 808.

Composite filler 924 and composite filler 926 are associated with composite stringer 810. As assembled in FIG. 8, composite filler 924 and composite filler 926 engage outer charge 816, inner charge 818, and composite skin 802. Composite filler 924 may be positioned between outer charge 816 and inner charge 818 on one side of composite stringer 810. Composite filler 926 may be positioned between outer charge 816 and inner charge 818 on an opposite side of composite stringer 810.

Composite filler 924 and composite filler 926 have longitudinal taper 925 and longitudinal taper 927. Longitudinal taper 925 of composite filler 924 engages a longitudinal taper in inner charge 818 of composite stringer 810. Longitudinal taper 927 of composite filler 926 engages another longitudinal taper in inner charge 818 of composite stringer 810. In some illustrative examples, longitudinal taper 925 and longitudinal taper 927 may be complementary to respective longitudinal tapers in inner charge 818 of composite stringer 810.

As depicted, inner charge 813 has portion 928. In FIG. 8, portion 928 engages the inner surface of outer charge 812. In this illustrative example, portion 928 is substantially the same shape as the inner surface of outer charge 812. Portion 928 may facilitate transfer of load along composite stringer 808 and into composite skin 802.

Similar to portion 928, inner charge 818 has portion 930. In FIG. 8, portion 930 engages the inner surface of outer charge 816. Portion 930 may facilitate transfer of load along composite stringer 810 and into composite skin 802.

Figure 10:
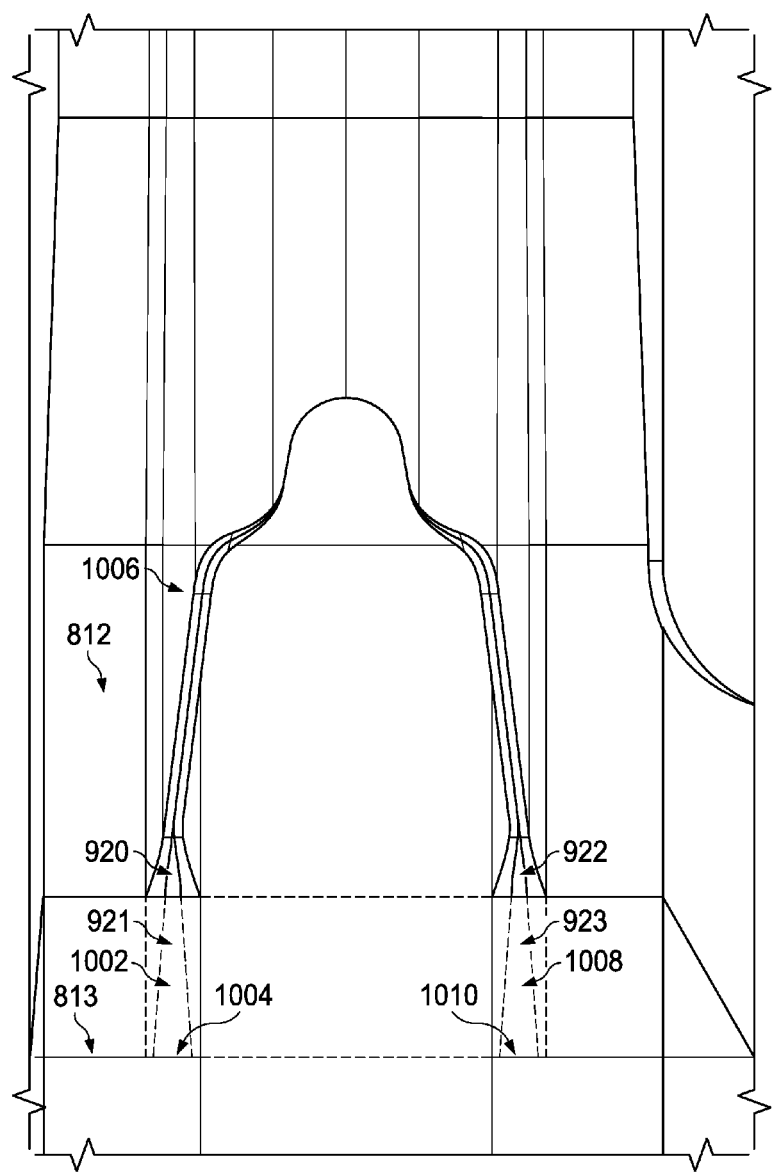
FIG. 10 is an illustration of a composite hat shaped stringer on a composite skin in accordance with an illustrative embodiment.

Turning now to FIG. 10, an illustration of a composite hat shaped stringer on a composite skin is depicted in accordance with an illustrative embodiment. FIG. 10 is a top view of structure 800 of FIG. 8 within box 10. Specifically, FIG. 10 is a top view of composite stringer 808 of FIG. 8 within box 10.

As depicted, stringer 808 is a hat shaped stringer. Composite stringer 808 has outer charge 812 and inner charge 813. Composite stringer 808 is associated with two composite fillers, composite filler 920 and composite filler 922.

Composite filler 920 engages outer charge 812, inner charge 813, and composite skin 802. Composite filler 920 has longitudinal taper 921. Longitudinal taper 921 of composite filler 920 engages longitudinal taper 1002 in inner charge 813 of composite stringer 808. As depicted, longitudinal taper 921 is complementary to longitudinal taper 1002 in composite stringer 808. Longitudinal taper 921 is shown in phantom. Longitudinal taper 1002 is also shown in phantom. Composite filler 920 decreases in size along longitudinal taper 921 until composite filler 920 terminates at location 1004.

Within body portion 1006 of composite stringer 808, composite filler 920 may have a substantially constant cross-section. In one illustrative example, composite filler 920 has a semi-triangular cross-section. In some illustrative examples, composite filler 920 may have a varying cross-section.

Composite filler 922 is associated with composite stringer 808. Composite filler 922 engages outer charge 812, inner charge 813, and composite skin 802.

Composite filler 922 has longitudinal taper 923. Longitudinal taper 923 of composite filler 922 engages longitudinal taper 1008 in inner charge 813 of composite stringer 808. As depicted, longitudinal taper 615 is complementary to longitudinal taper 1002 in composite stringer 808. Longitudinal taper 923 is shown in phantom. Longitudinal taper 1008 is also shown in phantom. Composite filler 922 decreases in size along longitudinal taper 923 until composite filler 922 terminates at location 1010.

Within body portion 1006 of composite stringer 808, composite filler 922 may have a substantially constant cross-section. In one illustrative example, composite filler 922 has a semi-triangular cross-section. In some illustrative examples, composite filler 922 may have a varying cross-section.

Figure 11:
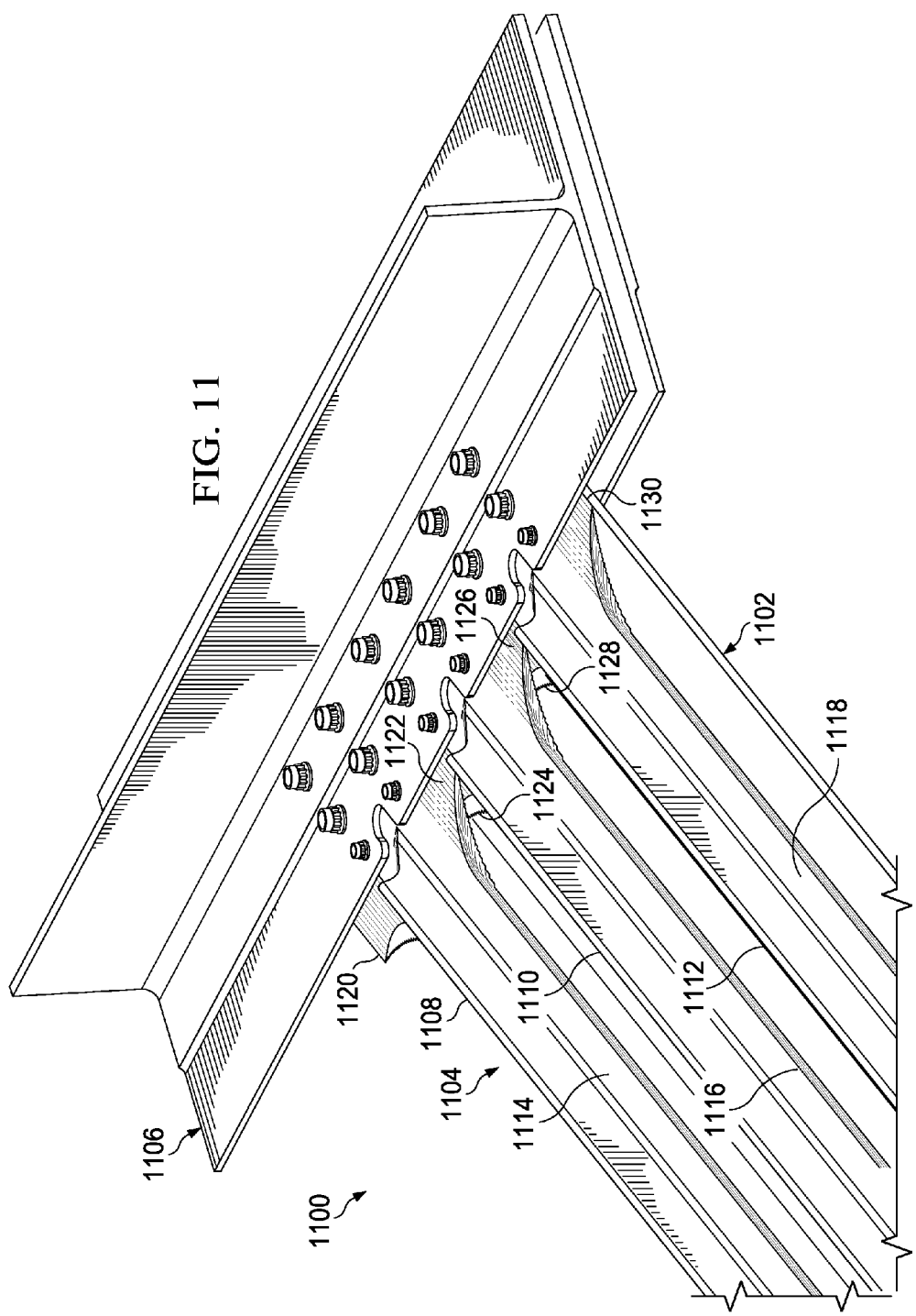
FIG. 11 is an illustration of composite blade stringers positioned on a composite skin in accordance with an illustrative embodiment.

Turning now to FIG. 11, an illustration of composite blade stringers positioned on a composite skin is depicted in accordance with an illustrative embodiment. In this depicted example, composite stringers 1104 are an example of a physical implementation of number of composite stringers 204 of FIG. 2. In this depicted example, composite skin 1102 may be a physical implementation of composite skin 202 of FIG. 2. Structure 1100 may be a physical implementation of a portion of platform 200 of FIG. 2.

In this illustrative example, structure 1100 comprises composite skin 1102, composite stringers 1104, and structural support 1106. Composite stringers 1104 comprise composite stringer 1108, composite stringer 1110, and composite stringer 1112.

As depicted, composite stringers 1104 comprise composite blade stringers. Composite stringers 1104 have a blade design, a similar design to composite stringers 304 of FIG. 3. However, in this illustrative example, flange 1114, flange 1116, and flange 1118 are different than flange 314, flange 316, and flange 318 of FIG. 3. Specifically, flange 1114, flange 1116, and flange 1118 are different from flange 314, flange 316, and flange 318 due to the difference between angle 315 of composite skin 302 and the angle of composite skin 1102 in FIG. 11.

As a result of the angle of composite skin 1102, first region 1120 and second region 1122 are positioned at substantially the same longitudinal position on composite stringer 1108. Likewise, third region 1124 and fourth region 1126 are positioned at substantially the same longitudinal position on composite stringer 1110. Similarly, fifth region 1128 and sixth region 1130 are positioned at substantially the same longitudinal position on composite stringer 1112.

As depicted, fourth region 1126 is placed over fifth region 1128. In this illustrative example, tapered plies of fourth region 1126 engage tapered plies of fifth region 1128. By tapered plies of fourth region 1126 engaging tapered plies of fifth region 1128, a joint may be formed. In some illustrative examples, this joint may be a scarf joint. In some illustrative examples, the tapered plies of fourth region 1126 may have a complementary taper to tapered plies of fifth region 1128.

By tapered plies of fourth region 1126 engaging tapered plies of fifth region 1128, a substantially flat surface may be created. This substantially flat surface may engage structural support 1106. Structural support 1106 engaging a substantially flat surface may provide desirable bending or mechanical characteristics to structure 1100.

As depicted, second region 1122 is placed over third region 1124. In this illustrative example, tapered plies of second region 1122 engage tapered plies of third region 1124. By tapered plies of second region 1122 engaging tapered plies of third region 1124, a joint may be formed. In some illustrative examples, this joint may be a scarf joint. In some illustrative examples, the tapered plies of second region 1122 may have a complementary taper to tapered plies of third region 1124.

By tapered plies of second region 1122 engaging tapered plies of third region 1124, a substantially flat surface may be created. This substantially flat surface may engage structural support 1106. Structural support 1106 engaging a substantially flat surface may provide desirable bending or mechanical characteristics to structure 1100.

Figure 12:
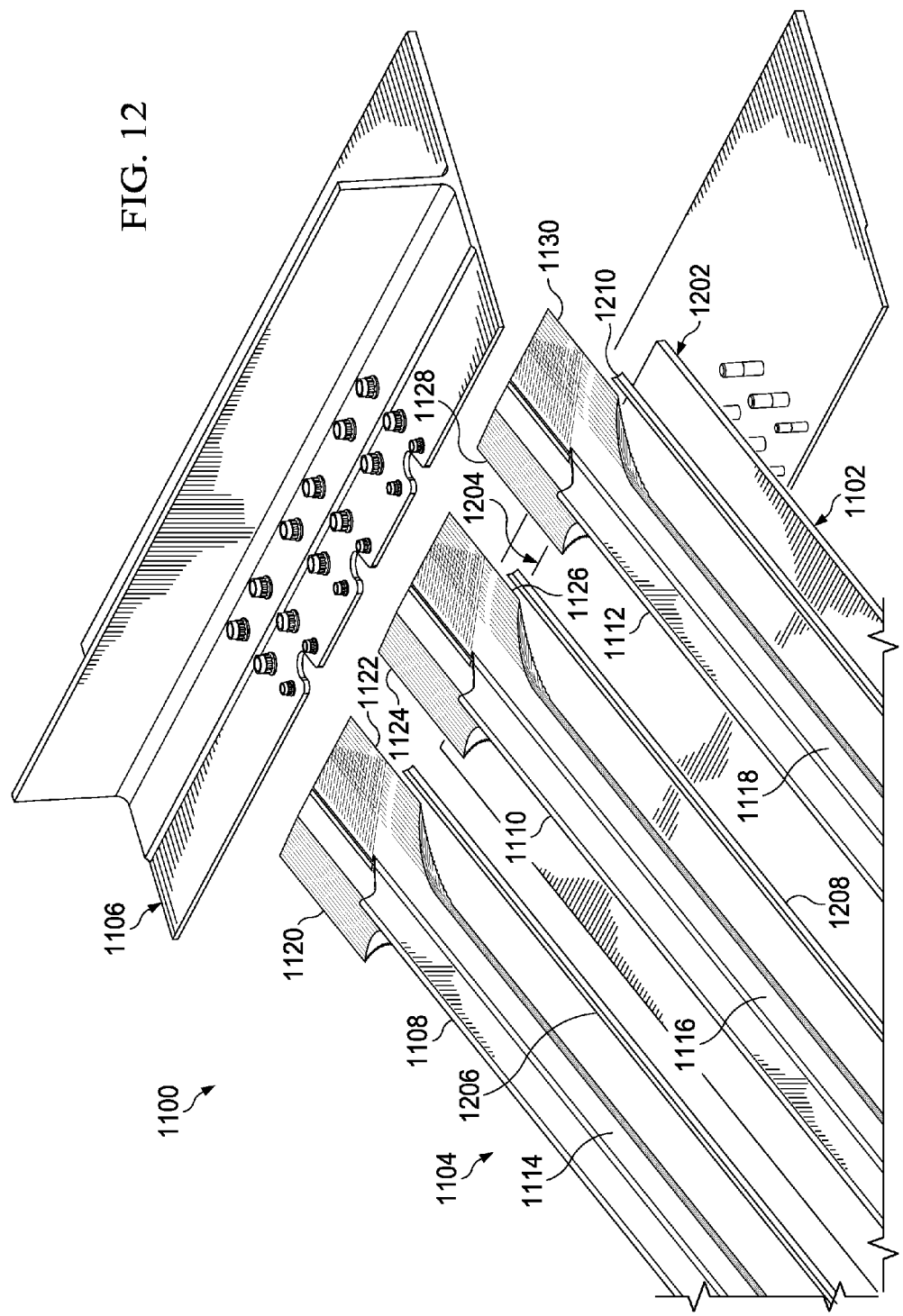
FIG. 12 is an illustration of an exploded view of composite blade stringers positioned on a composite skin in accordance with an illustrative embodiment.

Turning now to FIG. 12, an illustration of an exploded view of composite blade stringers positioned on a composite skin is depicted in accordance with an illustrative embodiment. In this depicted example, composite stringers 1104 are an example of a physical implementation of number of composite stringers 204 of FIG. 2. In this depicted example, composite skin 1102 may be a physical implementation of composite skin 202 of FIG. 2. FIG. 12 is an exploded view of structure 1100 of FIG. 11.

As depicted in FIG. 12, angle 1202 of edge 1204 of composite skin 1102 is substantially different than angle 315 of edge 620 of composite skin 302 in FIG. 6. Accordingly, flange 1114, flange 1116, and flange 1118 of composite stringers 1104 are substantially different than flange 314, flange 316, and flange 318 of FIGS. 3-6.

As depicted, composite filler 1206 is associated with composite stringer 1108. Composite filler 1206 has longitudinal taper 1214. When assembled, longitudinal taper 1214 engages a longitudinal taper in composite stringer 1108.

Composite filler 1208 is associated with composite stringer 1110. Composite filler 1208 has longitudinal taper 1216. When assembled, longitudinal taper 1216 engages a longitudinal taper in composite stringer 1110.

Composite filler 1210 is associated with composite stringer 1112. Composite filler 1210 has longitudinal taper 1218. When assembled, longitudinal taper 1218 engages a longitudinal taper in composite stringer 1112. Composite filler 1206, composite filler 1208, and composite filler 1210 may have a substantially similar cross-section as composite filler 516 of structure 300.

When assembled as in FIG. 11, composite filler 1206, composite filler 1208, and composite filler 1210 do not extend to 1204 of composite skin 1102. Plurality of fasteners 1212 may be positioned within structural support 1106 such that plurality of fasteners 1212 do not contact any of composite filler 1206, composite filler 1208, or composite filler 1210 when assembled.

Turning now to FIG. 13, an illustration of a composite layup prior to folding is depicted in accordance with an illustrative embodiment. Composite layup 1300 may be a physical embodiment of a layup to form first composite stringer 218 in FIG. 2. Composite layup 1300 may be an embodiment of a layup to form composite stringer 308 of FIG. 3.

Composite layup 1300 comprises a plurality of plies of composite material. Composite layup 1300 has first region 1302 comprising tapered plies, second region 1304 comprising tapered plies, third region 1306 comprising tapered plies, and fourth region 1308 comprising tapered plies. First region 1302 may be a physical implementation of first region 230 of FIG. 2. The tapered plies of first region 1302 may be configured to engage tapered plies of a region of an adjacent composite stringer to form a joint. Second region 1304 may be a physical implementation of second region 232 of FIG. 2. The tapered plies of second region 1304 may be configured to engage tapered plies of a region of an adjacent composite stringer to form a joint. In some illustrative examples, first region 1302 and second region 1304 may have complementary tapers.

Composite layup 1300 may be folded along fold line 1312, fold line 1314, and fold line 1316. When composite layup 1300 has been folded along fold line 1312, fold line 1314, and fold line 1316, composite layup 1300 forms a composite stringer having a blade shape such as composite stringers 304 of FIG. 3. When composite layup 1300 has been folded along fold line 1312, fold line 1314, and fold line 1316, the tapered plies of third region 1306 engage the tapered plies of fourth region 1308.

As depicted, fourth region 1308 has feature 1326. When folded to engage third region 1306, feature 1326 of fourth region 1308 may form a longitudinal taper. This longitudinal taper may be a physical example of longitudinal taper 226 from FIG. 2. Further, this longitudinal taper may be longitudinal taper 702 of FIG. 7. This longitudinal taper may be configured to engage a composite filler, such as composite filler 516 of FIG. 7.

Portion 1318 above fold line 1312 is a portion of a resulting flange after following along fold line 1312, fold line 1314, and fold line 1316. Portion 1320 below fold line 1316 is also a portion of the resulting flange after following along fold line 1312, fold line 1314, and fold line 1316.

When composite layup 1300 is folded along fold line 1312, fold line 1314, and fold line 1316, the resulting composite stringer may then be placed to engage two subsequent composite stringers. When composite layup 1300 is folded and engaging two other composite stringers at first region 1302 and second region 1304, the area between phantom line 1322 and phantom line 1324 may be a substantially flat surface. Additionally, the area between phantom line 1330 and phantom line 1328 may be a substantially flat surface.

Turning now to FIG. 14, an illustration of a composite layup folded to form a composite stringer is depicted in accordance with an illustrative embodiment. As depicted, composite layup 1300 may be a physical embodiment of a first composite stringer 218 in FIG. 2.

As depicted, composite layup 1300 has been folded to form a composite stringer. Composite layup 1300 has blade 1400 as well as flange 1402. Flange 1402 comprises portion 1318 and portion 1320 from FIG. 13. As depicted, third region 1306 is positioned over fourth region 1308 to form a joint. Longitudinal taper 1404 is shown in phantom in the joint formed by third region 1306 and fourth region 1308. In some illustrative examples, longitudinal taper 1404 is configured to engage a longitudinal taper of a composite filler.

In one illustrative example, composite layup 1300 may be positioned such that folded composite layup 1300 engages a composite filler at longitudinal taper 1404, a first adjacent composite stringer at first region 1302, and a second adjacent composite stringer at second region 1304. In this illustrative example, the area of flange 1402 between phantom line 1322 and phantom line 1324 forms a substantially flat surface.

The different components illustrated for composite layup 1300 are not meant to provide architectural limitations to the manner in which different embodiments may be implemented. The different illustrative embodiments may be implemented in an inspection environment including components in addition to and/or in place of those illustrated for composite layup 1300. Illustrations of other components shown in FIGS. 13-14 can be varied from the illustrative examples shown. For example, first region 1302 and second region 1304 may be located in substantially the same longitudinal location on composite layup 1300. In another illustrative example, composite layup 1300 may be configured to form a hat shaped composite stringer when folded. In yet another illustrative example, composite layup 1300 may not have second region 1304.

The different components shown in FIGS. 1 and 3-14 may be combined with components in FIG. 2, used with components in FIG. 2, or a combination of the two. Additionally, some of the components in FIGS. 1 and 3-14 may be illustrative examples of how components shown in block form in FIG. 2 can be implemented as physical structures.

Figure 15:
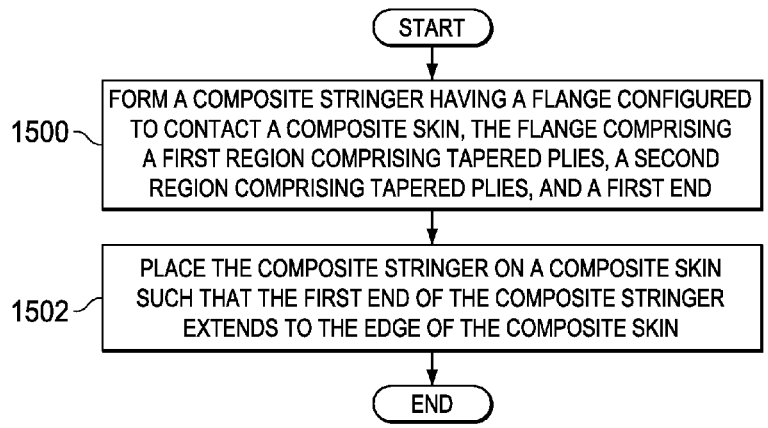
FIG. 15 is an illustration of a flowchart of a process for forming a portion of a platform in accordance with an illustrative embodiment.

Turning now to FIG. 15, an illustration of a flowchart of a process for forming a portion of a platform is depicted in accordance with an illustrative embodiment. The process illustrated in FIG. 15 may be implemented within platform 200 of FIG. 2. The process illustrated in FIG. 15 may be implemented to form structure 300 of FIG. 3.

In this illustrative example, the process begins by forming a composite stringer having a flange configured to contact a composite skin, the flange comprising a first region comprising tapered plies, a second region comprising tapered plies, and a first end (operation 1500). The tapered plies of the first region may be configured to complementarily engage tapered plies of a second composite stringer. The tapered plies of the second region may be configured to complementarily engage tapered plies of a third composite stringer. The first end may be configured to have an angle substantially the same as an angle of an edge of a composite skin.

The process then places the composite stringer on the composite skin such that the first end of the composite stringer extends to the edge of the composite skin (operation 1502). In some illustrative examples, a number of composite fillers may be placed between the composite stringer and the composite skin. In some of these illustrative examples, the number of composite fillers may be applied to the composite skin prior to placing the composite stringer on the composite skin. In some others of these illustrative examples, the number of composite fillers may be placed on the composite stringer prior to placing the composite stringer on the composite skin. In one illustrative example, the number of composite fillers may be longitudinally tapered to engage the composite stringer. In this illustrative example, the number of composite fillers and the composite stringer may have complementary longitudinal tapers. In this illustrative example, the composite stringer and the number of composite fillers may form a number of scarf joints.

In some illustrative examples, after placing the composite stringer on the composite skin, the structure may be cured. In these illustrative examples, the structure may comprise a number of composite stringers including the placed composite stringer, the composite skin, and any associated composite fillers. By co-curing the structure, joints may be formed between the number of composite stringers. Further, by co-curing the structure, joints may be formed between the associated composite fillers and the number of composite stringers.

Figure 16:
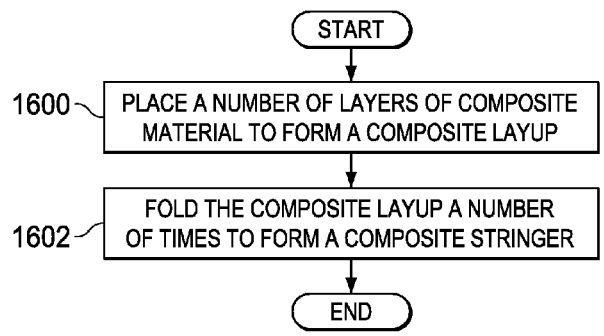
FIG. 16 is an illustration of a flowchart of a process for forming a composite stringer in accordance with an illustrative embodiment.

Turning now to FIG. 16, an illustration of a flowchart of a process for forming a composite stringer is depicted in accordance with an illustrative embodiment. The process illustrated in FIG. 16 may be implemented to form first composite stringer 218 of FIG. 2. Further, this process may be implemented to form composite layup 1300 of FIGS. 13 and 14.

The process begins by placing a number of layers of composite material to form a composite layup (operation 1600). In some illustrative examples, the number of layers of composite material may be placed to form a number of tapered plies. The process then folds the composite layup a number of times to form a composite stringer (operation 1602). In some illustrative examples, the composite layup may be folded to form a blade shaped composite stringer. In other illustrative examples, the composite layup may be folded to form a hat shaped composite stringer. In yet other illustrative examples, the composite layup may be folded to form an I or a J shaped composite stringer.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in the form of a block diagram in accordance with an illustrative embodiment. During pre-production, aircraft manufacturing and service method 1700 may include specification and design 1702 of aircraft 1800 of FIG. 18 and material procurement 1704.

During production, component and subassembly manufacturing 1706 and system integration 1708 of aircraft 1800 of FIG. 18 takes place. Thereafter, aircraft 1800 of FIG. 18 may go through certification and delivery 1710 in order to be placed in service 1712. While in service 1712 by a customer, aircraft 1800 of FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in the form of a block diagram in which an illustrative embodiment may be implemented. In this example, aircraft 1800 is produced by aircraft manufacturing and service method 1700 of FIG. 17 and may include airframe 1802 with systems 1804 and interior 1806.

Examples of systems 1804 include one or more of propulsion system 1808, electrical system 1810, hydraulic system 1812, and environmental system 1816. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 of FIG. 17. One or more illustrative embodiments may be used during component and subassembly manufacturing 1706. For example, number of composite stringers 204 of FIG. 2 may be used during component and subassembly manufacturing 1706.

Thus the illustrative embodiments provide a method and apparatus for composite stringers. By extending an end of a flange of a composite stringer to the edge of a composite skin, difference in strain level between the stringer and skin may be reduced or eliminated. Further, by extending an end of a flange of a composite stringer to the edge of a composite skin, delamination may be reduced or prevented.

A structural support may be positioned near the edge of the composite skin. Accordingly, flanges of adjacent composite stringers may form a substantially flat surface. The structural support may be positioned on the substantially flat surface. To form a substantially flat surface and without negatively impacting stringer strength, flanges of adjacent composite stringers may form joints. In some examples, these joints may be scarf joints.

In some illustrative examples, the composite stringers may have longitudinal tapers. These longitudinal tapers may engage longitudinal tapers of composite fillers. The respective longitudinal tapers may strengthen the composite stringers. The respective longitudinal tapers may aid in the transfer of load from the composite stringers to the composite skin.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a composite stringer having a flange configured to contact a composite skin, the flange comprising a first region comprising tapered plies, a second region comprising tapered plies, and a first end, wherein the first end is configured to extend to an edge of the composite skin.

2. The apparatus of claim 1, wherein the composite stringer is a first composite stringer having a first flange and wherein the apparatus further comprises:
    a second composite stringer having a second flange, wherein the tapered plies of the first region of the first flange engage tapered plies of a third region of the second flange of the second composite stringer to form a joint.

3. The apparatus of claim 2, wherein the joint formed by the first region and the third region is a scarf joint forming a substantially flat surface when positioned on the composite skin.

4. The apparatus of claim 3 further comprising:
    a structural support laid over the substantially flat surface, the structural support selected from a group consisting of a spar, a rib, and a chord.

5. The apparatus of claim 3, wherein the tapered plies of the second region are configured to engage tapered plies of a fourth region of a flange of a third composite stringer to form a joint and to extend the substantially flat surface.

6. The apparatus of claim 1, wherein an angle of the first end is substantially the same as an angle of the edge of the composite skin.

7. The apparatus of claim 1 further comprising:
    a structural support on a portion of the flange, the structural support selected from a group consisting of a spar, a rib, and a chord.

8. The apparatus of claim 1 further comprising:
    a number of composite fillers, the composite stringer tapered to engage the number of composite fillers.

9. The apparatus of claim 1, wherein the composite stringer is a hat shaped stringer comprising an inner layup of composite materials and an outer layup of composite materials, the inner layup comprising the flange.

10. The apparatus of claim 9, wherein the hat shaped stringer further comprises two composite fillers, the inner layup tapered to engage the two composite fillers.

11. The apparatus of claim 1, wherein the composite stringer is a blade shaped stringer, the blade shaped stringer comprising one layup of composite materials folded into a blade shape.

12. The apparatus of claim 11, wherein the blade shaped stringer is tapered to engage a composite filler positioned between the blade shaped stringer and the composite skin.

13. An apparatus comprising:
    a composite skin having an edge;
    a first composite stringer having a first flange configured to contact the composite skin, the first flange comprising a first region comprising tapered plies, a second region comprising tapered plies, and a first end, wherein the first end is configured to extend to the edge of the composite skin; and
    a second composite stringer having a second flange configured to contact the composite skin, the second flange comprising a third region comprising tapered plies, a fourth region comprising tapered plies, and a second end, wherein the second end is configured to extend to the edge of the composite skin.

14. The apparatus of claim 13, wherein the tapered plies of the first region engage the tapered plies of the third region to form a substantially flat surface.

15. The apparatus of claim 14 further comprising:
    a structural support laid over the substantially flat surface.

16. The apparatus of claim 14, wherein the tapered plies of the second region are configured to engage tapered plies of a fifth region of a third composite stringer to extend the substantially flat surface.

17. The apparatus of claim 14, wherein the tapered plies of the fourth region are configured to engage tapered plies of a sixth region of a fourth composite stringer to extend the substantially flat surface.

18. The apparatus of claim 13 further comprising:
    a first number of composite fillers engaging the first composite stringer and the composite skin, the first composite stringer tapered to engage the first number of composite fillers; and a second number of composite fillers engaging the second composite stringer and the composite skin, the second composite stringer tapered to engage the second number of composite fillers.

19. A method comprising:
forming a composite stringer having a flange configured to contact a composite skin, the flange comprising a first region comprising tapered plies, a second region comprising tapered plies, and a first end; and
placing the composite stringer on the composite skin such that the first end of the composite stringer extends to an edge of the composite skin.

20. The method of claim 19, wherein forming the composite stringer comprises:
placing a number of layers of composite material to form a composite layup; and
folding the composite layup a number of times to form the composite stringer.

\* \* \* \* \*